(12) United States Patent
Yang et al.

(10) Patent No.: US 12,489,557 B2
(45) Date of Patent: Dec. 2, 2025

(54) ETHERNET FRAME FRAMING METHOD AND DEVICE

(71) Applicant: ZTE Corporation, Shenzhen (CN)

(72) Inventors: Jian Yang, Shenzhen (CN); Jie Chen, Shenzhen (CN); Feng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 225 days.

(21) Appl. No.: 18/276,383

(22) PCT Filed: Jan. 28, 2022

(86) PCT No.: PCT/CN2022/074801
§ 371 (c)(1),
(2) Date: Mar. 11, 2024

(87) PCT Pub. No.: WO2022/166852
PCT Pub. Date: Aug. 11, 2022

(65) Prior Publication Data
US 2024/0223676 A1   Jul. 4, 2024

(30) Foreign Application Priority Data
Feb. 8, 2021   (CN) .......................... 202110180696.0

(51) Int. Cl.
*H04L 1/00*   (2006.01)
*H04L 69/00*   (2022.01)

(52) U.S. Cl.
CPC ............ *H04L 1/0061* (2013.01); *H04L 69/03* (2013.01)

(58) Field of Classification Search
CPC ... H04L 1/0041; H04L 1/0045; H04L 1/0061; H04L 1/0008; H04L 1/0007; H04L 69/03
See application file for complete search history.

(56) References Cited

U.S. PATENT DOCUMENTS

2015/0046775 A1*  2/2015  Prodan ................. H03M 13/09
                                                              714/776
2019/0044657 A1*  2/2019  Biederman ........... H04L 1/0045

FOREIGN PATENT DOCUMENTS

| CN | 101212390 A | 7/2008 |
| CN | 107437973 A | 12/2017 |
| CN | 112994843 A | 6/2021 |
| EP | 3609144 A1 | 2/2020 |

OTHER PUBLICATIONS

International Search Report for corresponding application PCT/CN2022/074801 filed Jan. 28, 2022; Mail date Apr. 1, 2022.

* cited by examiner

*Primary Examiner* — Shelly A Chase
(74) *Attorney, Agent, or Firm* — CANTOR COLBURN LLP

(57) ABSTRACT

Provided is an Ethernet frame framing method and device. The method includes: a receiving end receiving a data stream with a fine granularity-basic unit (Fg-BU); and the receiving end judging whether an Fg-BU frame is locked or unlocked according to whether the Fg-BU frame in the data stream is normal. In the present disclosure, the receiving end may judge whether the Fg-BU frame is locked or unlocked according to whether the received Fg-BU frame is normal.

20 Claims, 5 Drawing Sheets

| Sync header | Block type | | | | | | | |
|---|---|---|---|---|---|---|---|---|
| 10 | 0x78 | D0 | D1 | D2 | D3 | D4 | D5 | D6 |

Fig. 1

| Sync header | | | | | | | | |
|---|---|---|---|---|---|---|---|---|
| 10 | D0 | D1 | D2 | D3 | D4 | D5 | D6 | D7 |

Fig. 2

| Sync header | Block type | | | | | | | |
|---|---|---|---|---|---|---|---|---|
| 10 | | | | | | | | |

Fig. 3

| Sync header | Block type | | | | | | | |
|---|---|---|---|---|---|---|---|---|
| 10 | 0xFF | D0 | D1 | D2 | D3 | D4 | D5 | D6 |

Fig. 4

ETHERNET FRAME FRAMING METHOD AND DEVICE

CROSS-REFERENCE TO RELATED APPLICATION

The present disclosure is based on Chinese patent application CN 202110180696.0 filed on Feb. 8, 2021 and entitled "Ethernet Frame Framing Method and Device", and claims priority to this patent application, the disclosure of which is incorporated herein by reference in its entirety.

TECHNICAL FIELD

Embodiments of the present disclosure relate to the field of communications, and in particular to an Ethernet frame framing method and device.

BACKGROUND

In the existing Ethernet technology, in order to enable services with different granularities to flexibly access a bearer network, a fine granularity-basic unit (Fine granularity-basic unit, Fg-BU) is defined in an Ethernet Physical Coding Sublayer (PCS), so as to bear small-particle services.

The fine granularity-basic unit (Fg-BU) employs the 64B/66B coding type in Clause 82 of IEEE 802.3. An Fg-BU frame has a fixed length, and contains a start (S) block, h (h is an integer greater than or equal to 1) data (D) blocks and a termination (T) block, which have a total length of h+2 64B/66B blocks. The format of the start (S) block is shown in FIG. 1, the format of the data (D) block is shown in FIG. 2, and the format of the termination (T) block is shown in FIG. 3, wherein a block type value in FIG. 3 may be 0x87, 0x99, 0xAA, 0xB4, 0xCC, 0xD2, 0xE1 or 0xFF, the format of the Fg-BU frame is shown in FIG. 5, and in FIG. 5, with h=195 as an example, T7 is taken as an example of the terminal block, the format of the T7 block format is shown in FIG. 4, and FIG. 6 is a schematic diagram of the format of the overheads of the Fg-BU frame.

195 data blocks and the termination (T) block provide content with a total length of 195×8+7 bytes, that is, 1567 bytes. Each Fg-BU contains 7 bytes of overheads and 1560 bytes of payloads. The specific format of the overheads of the 7 bytes is defined as shown in FIG. 6. A multiple frame indication (Multiple Frame Indication, MFI) has a length of 6 bits and is used for indicating the serial number of each basic unit of a multiple frame, for the first basic unit in the multiple frame, the MFI is 0, and the MFI values of subsequent basic units are sequentially increased by 1. For a 5G channel, the MFI value range is 0-19; CRC has a length of 7 bits and is generated by performing calculation on the first 41 bits (containing fields behind Flag, and containing no starting 2-bit reserved bits and 6-bit MFI).

For a 5 Gbps transmission bandwidth, one Fg-BU contains 24 sub-slots (Sub-Slot), each sub-slot (Sub-Slot) includes 65 bytes, which may bear 8 65-bit blocks (64B/66B blocks are compressed into the 65-bit blocks), and each sub-slot (Sub-Slot) may be independently allocated to one customer for use. j Fg-BU frames constitute a multiple frame, 24×20=480 sub-slots (Sub-Slot) are provided in the multiple frame, and when j is equal to 20, the bandwidth of each sub-slot (Sub-Slot) is 10 Mbps.

Each sub-slot carries 8 64B/66B blocks from a customer service, and unused slots that are not allocated to the service are filled with 8 Error blocks. A total 24×8=192 64B/66B blocks of 24 sub-slots are filled into a payload slot after being compressed from 66 bits to 65 bits (for example, if the first bit of 65B is 0, it represents a data block, and if the first bit of 65B is 1, it represents a control block). After the overheads of 7 bytes are added, the blocks are sequentially filled into the payloads of the D block and the T7 block of the Fg-BU.

The specific format of the 56-bit overheads of each Fg-BU frame is shown in FIG. 6, including a multiple frame indication (MFI), an overhead channel use indication (Flag), a slot increase adjustment announcement (S bit), a slot validation indication (C bit), a slot adjustment request (CR bit), a slot adjustment response (CA bit), a GCC channel, a client ID, a sub-slot ID, and CRC. The GCC channel shares a bit location with the client ID and the sub-slot ID, when the Flag value is 11, it indicates that a corresponding bit location after CA in FIG. 6 is used by the GCC channel, and when the Flag value is 00, it indicates that the corresponding bit location is used by the client ID and the sub-slot ID.

After the Fg-BU frame is sent from a sending end to a receiving end, how the receiving end judges locking and unlocking is not explicitly defined at present.

SUMMARY

Embodiments of the present disclosure provide an Ethernet frame framing method and device, so as to at least solve the problem in the related art of how a receiving end judges the locking and unlocking of an Fg-BU frame.

According to an embodiment of the present disclosure, provided is an Ethernet frame framing method, including: a receiving end receiving a data stream with a fine granularity-basic unit (Fg-BU); and the receiving end judging whether an Fg-BU frame is locked or unlocked according to whether the Fg-BU frame in the data stream is normal.

In an exemplary embodiment, the receiving end judging that the Fg-BU frame is locked according to whether the Fg-BU frame in the data stream is normal includes: if the receiving end receives consecutive N normal Fg-BU frames, judging that the Fg-BU frame is locked, wherein N is an integer greater than or equal to 1.

In an exemplary embodiment, when the Fg-BU frame satisfies one or more of the following conditions, the Fg-BU frame is normal: a start block of the Fg-BU frame is normal; CRC in the overheads of the Fg-BU frame is correct; a terminal block of the Fg-BU frame is normal; a data blocks of the Fg-BU frame are normal, wherein a is an integer greater than or equal to 0; and the length of the Fg-BU frame is a predetermined number of blocks.

In an exemplary embodiment, the receiving end judging that the Fg-BU frame is unlocked according to whether the Fg-BU frame in the data stream is normal includes: if the receiving end receives consecutive M abnormal Fg-BU frames, judging that the Fg-BU frame is unlocked, wherein M is an integer greater than or equal to 1.

In an exemplary embodiment, when the Fg-BU frame satisfies one or more of the following conditions, the Fg-BU frame is abnormal: the start block of the Fg-BU frame is abnormal; the terminal block of the Fg-BU frame is abnormal; the CRC in the overheads of the Fg-BU frame is incorrect; b data blocks of the Fg-BU frame are abnormal, wherein b is an integer greater than or equal to 0; and the length of the Fg-BU frame is not the predetermined number of blocks.

In an exemplary embodiment, after the receiving end judges that the Fg-BU frame is locked, the method further includes: the receiving end extracting the Fg-BU frame for processing.

In an exemplary embodiment, after the receiving end judges that the Fg-BU frame is unlocked, the method further includes: the receiving end reporting alarm information of unlocking of the Fg-BU frame.

In an exemplary embodiment, after the receiving end judges that the Fg-BU frame is locked, the method further includes: the receiving end judging whether an Fg-BU multiple frame is locked or unlocked according to a multiple frame indication (MFI) value.

In an exemplary embodiment, the receiving end judging that the Fg-BU multiple frame is locked according to the multiple frame indication (MFI) value includes: if the MFI values of consecutive X Fg-BU frames received by the receiving end are normal, judging that the Fg-BU multiple frame is locked, wherein X is an integer greater than or equal to 1.

In an exemplary embodiment, the receiving end judging that the Fg-BU multiple frame is unlocked according to the multiple frame indication (MFI) value includes: if the MFI values of consecutive Y Fg-BU frames received by the receiving end are abnormal, judging that the Fg-BU multiple frame is unlocked, wherein Y is an integer greater than or equal to 1.

In an exemplary embodiment, after the receiving end judges that the Fg-BU multiple frame is locked, the method further includes: the receiving end extracting the Fg-BU multiple frame processing.

In an exemplary embodiment, after the receiving end judges that the Fg-BU multiple frame is unlocked, the method further includes: the receiving end reporting alarm information of unlocking of the multiple frame.

According to another embodiment of the present disclosure, provided is an Ethernet frame framing device, applied to a receiving end. The device includes: a receiving module, configured to receive a data stream with a fine granularity-basic unit (Fg-BU); and a first judging module, configured to judge whether an Fg-BU frame is locked or unlocked according to whether the Fg-BU frame in the data stream is normal.

In an exemplary embodiment, the first judging module includes: a first judging unit, configured to judge that the Fg-BU frame is locked in the case that consecutive N normal Fg-BU frames are received, wherein N is an integer greater than or equal to 1.

In an exemplary embodiment, the first judging module includes: a second judging unit, configured to judge that the Fg-BU frame is unlocked in the case that consecutive M abnormal Fg-BU frames are received, wherein M is an integer greater than or equal to 1.

In an exemplary embodiment, the device further includes: a second judging module, configured to judge, in the case that the Fg-BU frame is locked, whether a multiple frame is locked or unlocked according to a multiple frame indication (MFI) value.

In an exemplary embodiment, the second judging module includes: a third judging unit, configured to judge that the multiple frame is locked in the case that the MFI values of received consecutive X frames are normal, wherein X is an integer greater than or equal to 1.

In an exemplary embodiment, the second judging module includes: a fourth judging unit, configured to judge that the multiple frame is unlocked in the case that the MFI values of received consecutive Y frames are abnormal, wherein Y is an integer greater than or equal to 1.

According to yet another embodiment of the present disclosure, further provided is a computer-readable storage medium, wherein a computer program is stored in the computer-readable storage medium, and the computer program is configured to execute the steps in any one of the foregoing method embodiments when running.

According to yet another embodiment of the present disclosure, further provided is an electronic device, including a memory and a processor, wherein a computer program is stored in the memory, and the processor is configured to run the computer program to execute the steps in any one of the foregoing method embodiments.

In the above embodiments of the present disclosure, the receiving end judges whether the Fg-BU frame is locked or unlocked according to whether the received Fg-BU frame is normal, thereby realizing the judgment of the locking or unlocking of the Fg-BU frame.

BRIEF DESCRIPTION OF THE DRAWINGS

FIG. 1 is a schematic diagram of the format of a start (S) block according to the related art;

FIG. 2 is a schematic diagram of the format of a data (D) block according to the related art;

FIG. 3 is a schematic diagram of the format of a termination (T) block according to the related art;

FIG. 4 is a schematic diagram of the format of a termination (T7) block according to the related art;

DETAILED DESCRIPTION OF THE EMBODIMENTS

Embodiments of the present disclosure will be described in detail hereinafter with reference to the drawings and in combination with embodiments.

It should be noted that, the terms "first", "second" and the like in the specification and claims of the present disclosure, as well as the above drawings are used to distinguish similar objects, and are not necessarily used to describe a specific order or sequence.

Figure 7:
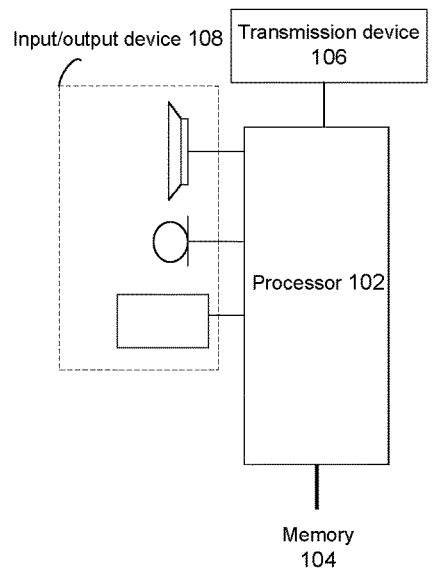
FIG. 7 is a schematic structural diagram of a computer terminal according to an embodiment of the present disclosure.

The method embodiments provided in the embodiments of the present application may be executed in a mobile terminal, a computer terminal, or a similar computing device. Taking running on the computer terminal as an example, FIG. 7 is a block diagram of a hardware structure of a computer terminal according to an embodiment of the present disclosure. As shown in FIG. 7, the computer terminal may include one or more (only one is shown in FIG. 7) processors 102 (the processor 102 may include, but is not limited to, a processing device such as a micro processing unit (MCU) or a field-programmable gate array (FPGA) or the like), and a memory 104 for storing data, wherein the computer terminal may further include a transmission device 106 for a communication function, and an input/output device 108. Those ordinary skilled in the art can understand that, the structure shown in FIG. 7 is only schematic, and is not intended to limit the structure of the computer terminal. For example, the computer terminal may further include more or fewer components than shown in FIG. 7, or have a different configuration as shown in FIG. 7.

The memory 104 may be configured to store computer programs, for example, software programs and modules of application software, such as a computer program corresponding to the Ethernet frame framing method in the embodiments of the present disclosure. By means of running the computer programs stored in the memory 104, the processor 102 executes various functional applications and data processing, that is, implements the above method. The memory 104 may include a high-speed random access memory, and may also include a nonvolatile memory, such as one or more magnetic disk storage devices, a flash memory, or other nonvolatile solid-state memories. In some instances, the memory 104 may further include memories that are disposed remotely relative to the processor 102, and these memories may be connected to the computer terminal by a network. Instances of the network include, but are not limited to, the Internet, an intranet, a local area network, a mobile communication network, and combinations thereof.

The transmission device 106 is configured to receive or send data via a network. Specific instances of the above network may include a wireless network provided by a communication provider of the computer terminal. In one instance, the transmission device 106 includes a network interface controller (Network Interface Controller, NIC for short), which may be connected with other network devices through a base station, so as to communicate with the Internet. In one instance, the transmission device 106 may be a radio frequency (Radio Frequency, RF for short) module, which is configured to communicate with the Internet in a wireless manner.

Figure 8:
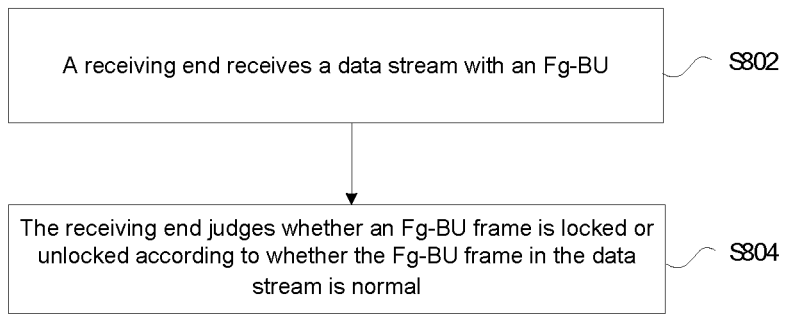
FIG. 8 is a flowchart of an Ethernet frame framing method according to an embodiment of the present disclosure.

In the present embodiment, an Ethernet frame framing method capable of running on the computer terminal is provided. FIG. 8 is a flowchart of an Ethernet frame framing method according to an embodiment of the present disclosure, and as shown in FIG. 8, the process includes the following steps:

Step S802: a receiving end receives a data stream with a fine granularity-basic unit (Fg-BU); and Step S804: the receiving end judges whether an Fg-BU frame is locked or unlocked according to whether the Fg-BU frame in the data stream is normal.

In the present embodiment, for the fine granularity-basic unit (Fg-BU), the Fg-BU frame being locked may be judged in the following four methods:

Method 1: the receiving end receives consecutive N (N is an integer greater than or equal to 1) normal Fg-BU frames.

The judgement of the Fg-BU frame being normal needs to satisfy the following two conditions at the same time:

1) A start (S) block is normal, that is, a 2-bit sync header (sync header) and/or 8-bit block type (block type) value of the S block is normal. In the present embodiment, the sync header and the block type value of the S block are shown in FIG. 1.

2) The length of each frame is h+2 (h is an integer greater than or equal to 1) blocks, including one start (S) block, h data (D) blocks, and one termination (T) block, that is, it is equivalent to verifying that the sync headers of a data (D) blocks (a is an integer less than or equal to h and greater than or equal to zero), and the sync header and/or the block type of the termination (T) block are all normal. In the present embodiment, the sync header of the data (D) block is shown in FIG. 2. The sync header and the type value of the termination (T) block are shown in FIG. 3.

Figure 5:
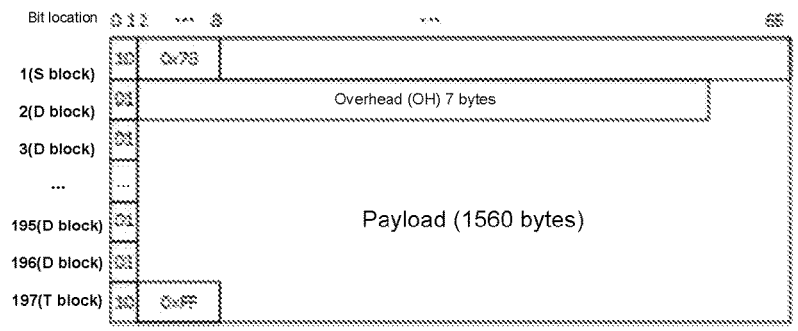
FIG. 5 is a schematic diagram of the format of an Fg-BU frame according to the related art.
Figure 6:
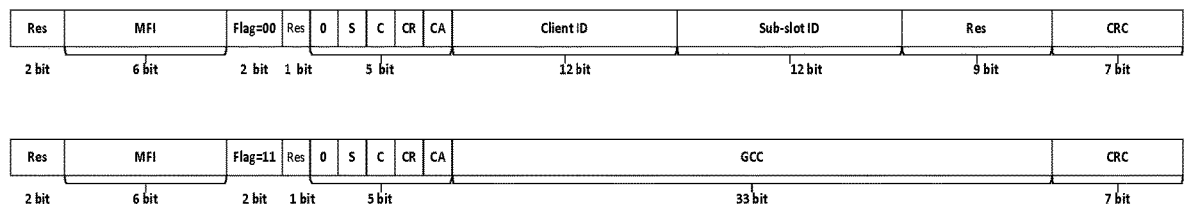
FIG. 6 is a schematic diagram of the format of the overheads of the Fg-BU frame according to the related art.

Method 2: the receiving end receives consecutive N (N is an integer greater than or equal to 1) normal Fg-BU frames, and the judgement of the Fg-BU frame being normal needs to satisfy the following conditions:

The start (S) block is normal, that is, the 2-bit sync header (sync header) and/or 8-bit block type (block type) value of the S block is normal. In the present embodiment, the sync header and the block type value of the S block are shown in FIG. 1. Or, CRC in the overheads of the FG-BU frame is correct, wherein the format of the overheads of the Fg-BU frame is shown in FIG. 6. Or, the termination (T) block is normal, that is, the 2-bit sync header (sync header) and/or 8-bit block type (block type) value of the T block is normal.

Method 3: the receiving end receives consecutive N (N is an integer greater than or equal to 1) normal Fg-BU frames, and the judgement of the Fg-BU frame being normal needs to satisfy the following two conditions at the same time:

1) The start (S) block is normal, that is, the 2-bit sync header (sync header) and/or 8-bit block type (block type) value of the S block is normal, wherein the sync header and the block type value of the S block are shown in FIG. 1. Or, the CRC in the overheads of the FG-BU frame is correct, wherein the format of the overheads of the Fg-BU frame is shown in FIG. 6.

2) The length of each frame is h+2 (h is an integer greater than or equal to 1) blocks, including one start (S) block, h data (D) blocks, and one termination (T) block, that is, it is equivalent to verifying that the sync headers and/or the block types of p+r (wherein both p and r are integers less than or equal to h and greater than or equal to zero, and p+r=h) 64B/66B blocks behind the start block (for p data blocks, whether the sync headers thereof are data blocks is not verified, and only whether the lengths thereof are equal to p multiplying 66 bits is verified, and for r data blocks, whether the sync headers thereof are data blocks needs to be verified), and the termination (T) block are normal. In the present embodiment, the sync header and the type value of the termination (T) block are shown in FIG. 3.

Method 4: the receiving end receives consecutive U+V (wherein both U and V are integers greater than or equal to 0, and U+V=N) normal Fg-BU frames, and the judgement of the Fg-BU frame being normal needs to satisfy the following three conditions at the same time:

1) U Fg-BU frames are normal: U start (S) blocks are normal, that is, the 2-bit sync header (sync header) and/or 8-bit block type (block type) value of the S block is normal, wherein the sync header and the block type value of the S block are shown in FIG. 1.

2) V Fg-BU frames are normal: the CRC in the overheads of the V FG-BU frames is correct, wherein the format of the overheads of the Fg-BU frame is shown in FIG. 6.

3) The length of each frame is h+2 (h is an integer greater than or equal to 1) blocks, including one start (S) block, h data (D) blocks, and one termination (T) block, that is, it is equivalent to verifying that the sync headers of a (a is an integer less than or equal to h and greater than or equal to zero) data (D) blocks, and the sync header and/or the block type of the termination (T) block are all normal. In the present embodiment, the sync header of the data (D) block is shown in FIG. 2. The sync header and the type value of the termination (T) block are shown in FIG. 3.

In the present embodiment, after the receiving end judges that the FG-BU frame is locked, the method may further include: the receiving end extracting the FG-BU frame for processing.

In the present embodiment, for the fine granularity-basic unit (Fg-BU), the unlocking of the frame may be judged by using the following method:

Method 1: consecutive M (M is an integer greater than or equal to 1) Fg-BU frames are abnormal, including: the S block is abnormal, that is, the 2-bit sync header (sync header) and/or 8-bit block type (block type) value of the S block is incorrect; or the length of the Fg-BU frame is not h+2 blocks, that is, it is equivalent to verifying that any one of the sync headers of b (b is an integer greater than or equal to zero and less than or equal to h) D blocks, the sync header of the T block, and the type of the T block is incorrect.

Method 2: consecutive M (M is an integer greater than or equal to 1) Fg-BU frames are abnormal, including: the S block is abnormal, that is, the 2-bit sync header (sync header) and/or 8-bit block type (block type) value of the S block is incorrect; or the CRC in the overheads of the FG-BU frame is incorrect, wherein the format of the overheads of the Fg-BU frame is shown in FIG. 6; or, the length of the Fg-BU frame is not h+2 blocks, that is, it is equivalent to verifying that any one of the sync headers of b (b is an integer greater than or equal to zero and less than or equal to h) D blocks, the sync header of the T block, and the type of the T block is incorrect.

Method 3: consecutive M (M is an integer greater than or equal to 1) Fg-BU frames are abnormal, including: E (E is an integer greater than or equal to 0 and less than M) S blocks are abnormal, that is, the 2-bit sync header (sync header) and/or 8-bit block type (block type) value of the S block is incorrect; or the CRC in the overheads of F (F is an integer greater than or equal to 0 and less than M) FG-BU frames is incorrect, wherein the format of the overheads of the Fg-BU frame is shown in FIG. 6; or the length of G (G is an integer greater than or equal to 0 and less than M) Fg-BU frames is not h+2 blocks (h is an integer greater than or equal to 1), that is, it is equivalent to verifying that any one of b (b is an integer less than or equal to h and greater than or equal to zero) data blocks (whether the sync header is a data block is not verified, and only whether the length of the block is b*66 bits is verified), the sync header of the T block, and the type of the T block is incorrect, wherein E+F+G=M, and M is an integer greater than or equal to 1.

In the present embodiment, after the receiving end judges that the FG-BU frame is unlocked, the method may further include: the receiving end reporting alarm information of unlocking of the FG-BU frame.

In the present embodiment, after the receiving end judges that the FG-BU frame is locked, the method may further include: judging whether a multiple frame is locked or unlocked according to a multiple frame indication (MFI) value. That is, on the premise of framing, the MFI (6-bit) is further verified.

In the present embodiment, for a fine granularity-basic unit multiple frame, the locking and unlocking may be judged by using the following method:

If the MFI values of consecutive X (X is an integer greater than or equal to 1) frames are normal, that is, the MFI values are sequentially incremented, and an MFI value range definition (such as 0-19, or other predefined ranges) is satisfied, it is judged that the multiple frame is locked; and if the MFI values of consecutive Y frames are abnormal, that is, the MFI values are not sequentially incremented, or the MFI value range definition is not satisfied, it is judged that the multiple frame is unlocked.

In the present embodiment, after the receiving end judges that the multiple frame is unlocked, the method may further include: the receiving end reporting alarm information of unlocking of the multiple frame.

By means of the description of the above embodiments, those skilled in the art can clearly understand that the method according to the above embodiments may be implemented by software plus a necessary general hardware platform, and certainly may also be implemented by hardware, but in many cases, the former is a better implementation. Based on this understanding, the technical solutions of the present disclosure substantially, or the part contributing to the prior art may be implemented in the form of a software product, the computer software product is stored in a storage medium (e.g., an ROM/RAM, a magnetic disk, an optical disk), and includes several instructions for enabling a computer device (which may be a mobile phone, a computer, a server, or a network device or the like) to execute the method in various embodiments of the present disclosure.

In the present embodiment, further provided is an Ethernet frame framing device, the device is used for implementing the above embodiments and preferred embodiments, and what has been described will not be repeated herein. As used below, the term "module" or "unit" may implement a combination of software and/or hardware of a predetermined function. Although the device described in the following embodiments is preferably implemented in software, implementations of hardware, or a combination of software and hardware are also possible and conceivable.

Figure 9:
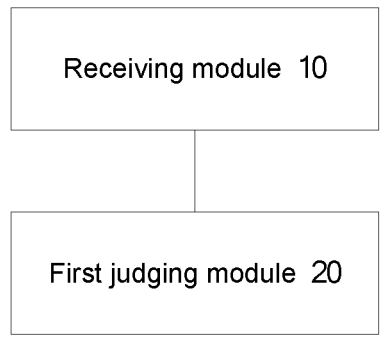
FIG. 9 is a schematic structural diagram of an Ethernet frame framing device according to an embodiment of the present disclosure.

FIG. 9 is a structural block diagram of an Ethernet frame framing device according to an embodiment of the present disclosure, as shown in FIG. 9, the Ethernet frame framing device is applied to a receiving end, and the device includes a receiving module 10 and a first judging module 20.

The receiving module 10 is configured to receive a data stream with a fine granularity-basic unit (Fg-BU).

The first judging module 20 is configured to judge whether an Fg-BU frame is locked or unlocked according to whether the Fg-BU frame in the data stream is normal.

Figure 10:
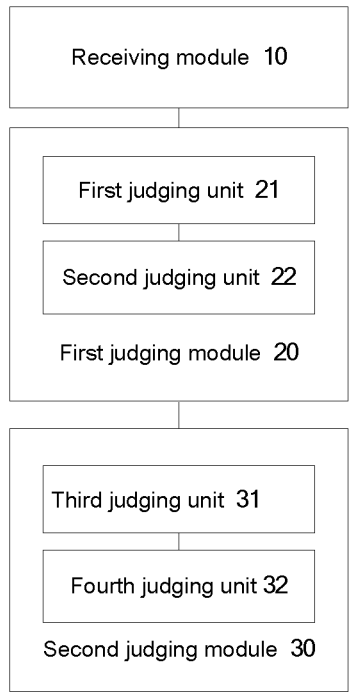
FIG. 10 is a schematic structural diagram of an Ethernet frame framing device according to another embodiment of the present disclosure.

FIG. 10 is a structural block diagram of an Ethernet frame framing device according to another embodiment of the present disclosure, and as shown in FIG. 10, the device further includes a second judging module 30 in addition to all modules shown in FIG. 9. The second judging module 30 is configured to judge, in the case that the Fg-BU frame is locked, whether a multiple frame is locked or unlocked according to a multiple frame indication (MFI) value.

In the present embodiment, the first judging module 20 further includes a first judging unit 21 and a second judging unit 22.

The first judging unit 21 is configured to judge that the Fg-BU frame is locked in the case that consecutive N normal Fg-BU frames are received, wherein N is an integer greater than or equal to 1.

The second judging unit 22 is configured to judge that the Fg-BU frame is unlocked in the case that consecutive M abnormal Fg-BU frames are received, wherein M is an integer greater than or equal to 1.

In the present embodiment, the second judging module 30 may further include a third judging unit 31 and a fourth judging unit 32.

The third judging unit 31 is configured to judge that the multiple frame is locked in the case that the MFI values of received consecutive X frames are normal, wherein X is an integer greater than or equal to 1.

The fourth judging unit 32 is configured to judge that the multiple frame is unlocked in the case that the MFI values of received consecutive Y frames are abnormal, wherein Y is an integer greater than or equal to 1.

It should be noted that the foregoing modules may be implemented by software or hardware, and for the latter, the foregoing modules may be implemented in the following manner, but are not limited thereto: the foregoing modules are all located in the same processor; or the foregoing modules are respectively located in different processors in the form of any combination.

In order to facilitate the understanding of the technical solutions provided in the embodiments of the present disclosure, embodiments in combination with specific scenarios will be described below.

Embodiment 1

Figure 11:
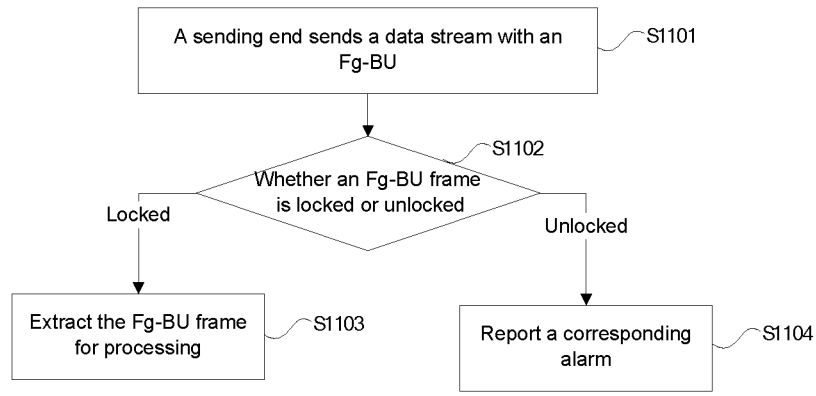
FIG. 11 is a schematic flowchart of a method for judging the locking and unlocking of an Fg-BU frame according to Embodiment 1 of the present disclosure.

The present embodiment provides a method for judging the locking and unlocking of a fine granularity-basic unit (Fg-BU) frame. As shown in FIG. 11, the method mainly includes the following steps:

Step S1101: in an Ethernet or a metro transport network (Metro Transport Network, MTN) based on an Ethernet technology, and a slicing packet network (Slicing packet network, SPN), a sending end sends a data stream with a fine granularity-basic unit (Fg-BU).

Step S1102: after receiving the data stream, a receiving end judges whether an Fg-BU frame is locked or unlocked.

In the present embodiment, if the receiving end receives consecutive N (N is an integer greater than or equal to 1) normal Fg-BU frames, it is judged that the Fg-BU frame is locked. The judgement of the Fg-BU frame being normal needs to satisfy the following two conditions at the same time:

1) A start (S) block is normal, including that a 2-bit sync header (sync header) and/or 8-bit block type (block type) value is normal, wherein the sync header and the block type value of the S block are shown in FIG. 1.

2) The length of each frame is h+2 (h is an integer greater than or equal to 1) blocks, that is, it is equivalent to verifying that the sync headers of h D blocks, and the sync header and the block type of a T block are normal. The sync header of the D block is shown in FIG. 2. The sync header and the type value of the T block are shown in FIG. 3.

In the present embodiment, if the receiving end receives consecutive M (M is an integer greater than or equal to 1) abnormal Fg-BU frames, including: the S block is abnormal, that is, the 2-bit sync header (sync header) and/or 8-bit block type (block type) value is incorrect; or the length of the Fg-BU frame is not h+2 (h is an integer greater than or equal to 1) blocks, that is, it is equivalent to verifying that any one of the sync headers of h D blocks, the sync header of the T block, and the type of the T block is incorrect, it is judged that the Fg-BU frame is unlocked.

Step S1103: after judging that the Fg-BU frame is locked, the receiving end extracts the Fg-BU frame for processing.

Step S1104: after judging that the Fg-BU frame is unlocked, the receiving end reports a corresponding alarm.

Embodiment 2

Figure 12:
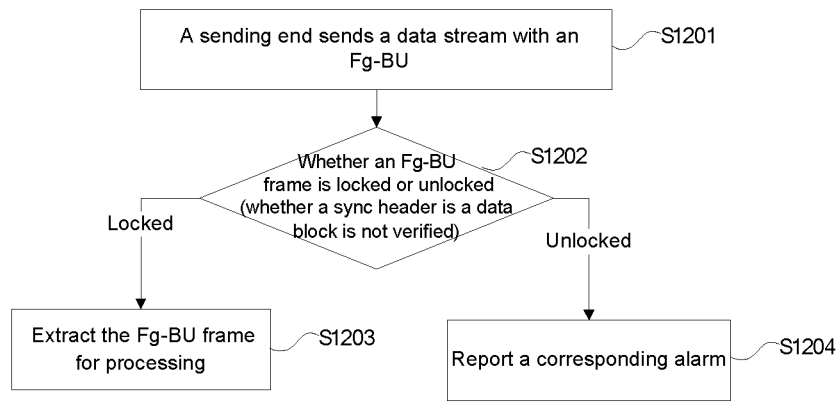
FIG. 12 is a schematic flowchart of a method for judging the locking and unlocking of an Fg-BU frame according to Embodiment 2 of the present disclosure.

The present embodiment provides a method for judging the locking and unlocking of a fine granularity-basic unit (Fg-BU) frame. As shown in FIG. 12, the method mainly includes the following steps:

Step S1201: in an Ethernet or a metro transport network (Metro Transport Network, MTN) based on an Ethernet technology, and a slicing packet network (Slicing packet network, SPN), a sending end sends a data stream with a fine granularity-basic unit (Fg-BU).

Step S1202: after receiving the data stream, a receiving end judges whether an Fg-BU frame is locked or unlocked.

In the present embodiment, if the receiving end receives consecutive N (N is an integer greater than or equal to 1) normal Fg-BU frames, it is judged that the Fg-BU frame is locked. The judgement of the Fg-BU frame being normal needs to satisfy the following two conditions at the same time:

1) An S block is normal, including that a 2-bit sync header (sync header) and/or 8-bit block type (block type) value is normal, wherein the sync header and the block type value of the S block are shown in FIG. 1.

2) The length of each frame is h+2 (h is an integer greater than or equal to 1) blocks, that is, it is equivalent to verifying that the sync headers and/or the block types of h 64B/66B blocks (whether the sync headers are data blocks is not verified) after the S block, and the T block are normal. The sync header and the type value of the T block are shown in FIG. 3.

In the present embodiment, if the receiving end receives consecutive M (M is an integer greater than or equal to 1) abnormal Fg-BU frames, including: the S block is abnormal, that is, the 2-bit sync header (sync header) and/or 8-bit block type (block type) value is incorrect; or the length of the Fg-BU frame is not h+2 blocks, that is, it is equivalent to verifying that the sync headers or the type values of h 64B/66B blocks (whether the sync headers thereof are data blocks is not verified) after the S block are incorrect, or the sync header or the type value of the T block is incorrect, it is judged that the Fg-BU frame is unlocked.

Step S1203: after judging that the Fg-BU frame is locked, the receiving end extracts the Fg-BU frame for processing.

Step S1204: after judging that the Fg-BU frame is unlocked, the receiving end reports a corresponding alarm.

Embodiment 3

Figure 13:
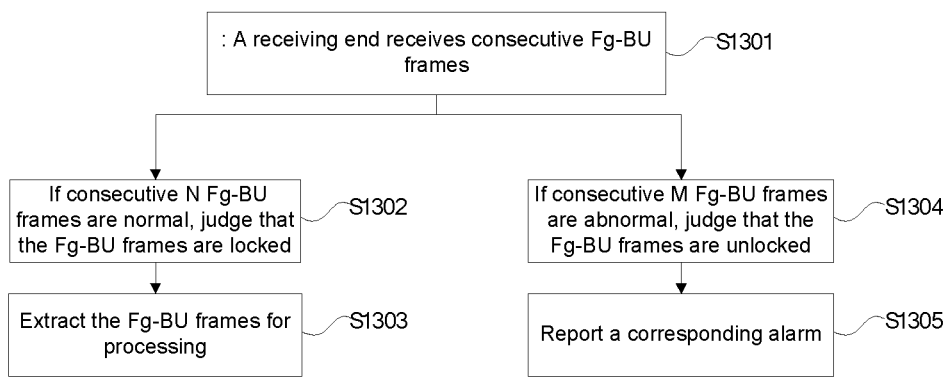
FIG. 13 is a schematic flowchart of a method for judging the locking and unlocking of an Fg-BU frame according to Embodiment 3 of the present disclosure.

The present embodiment provides a method for judging the locking and unlocking of a fine granularity-basic unit (Fg-BU). As shown in FIG. 13, the method mainly includes the following steps:

Step S1301: a receiving end receives an Fg-BU frame.

Step S1302: if consecutive N Fg-BU frames are normal, it is judged that the Fg-BU frame is locked. The judgement of the Fg-BU frame being normal needs to satisfy the following two conditions at the same time:

1) An S block is normal, including that a 2-bit sync header (sync header) and/or 8-bit block type (block type) value is normal (the sync header and the block type value of the S block are shown in FIG. 1), or CRC in the overheads of the FG-BU frame is correct (as shown in FIG. 6).

2) The length of each frame is h+2 (h is an integer greater than or equal to 1) blocks, it is equivalent to verifying that the sync headers of a (a is an integer greater than or equal to zero and less than or equal to h) data (D) blocks, and the sync header and the block type of the T block are normal. The sync header of the D block is shown in FIG. 2. The sync header and the type value of the T block are shown in FIG. 3.

Step S1303: after judging that the Fg-BU frame is locked, the receiving end extracts the Fg-BU frame for processing.

Step S1304: if the receiving end receives consecutive M (M is an integer greater than or equal to 1) abnormal Fg-BU frames, including: the S block is abnormal, that is, the 2-bit sync header (sync header) is incorrect, or the 8-bit block type (block type) value is incorrect; or the CRC (as shown in FIG. 6) in the overheads of the FG-BU frame is incorrect; or the length of the Fg-BU frame is not h+2 blocks (which is equivalent to verifying that any one of the sync headers of b (b is an integer greater than or equal to zero and less than or equal to h) D blocks, the sync header of the T block, and the type of the T block is incorrect), it is judged that the Fg-BU frame is unlocked.

Step S1305: after judging that the Fg-BU frame is unlocked, the receiving end reports a corresponding alarm.

Embodiment 4

Figure 14:
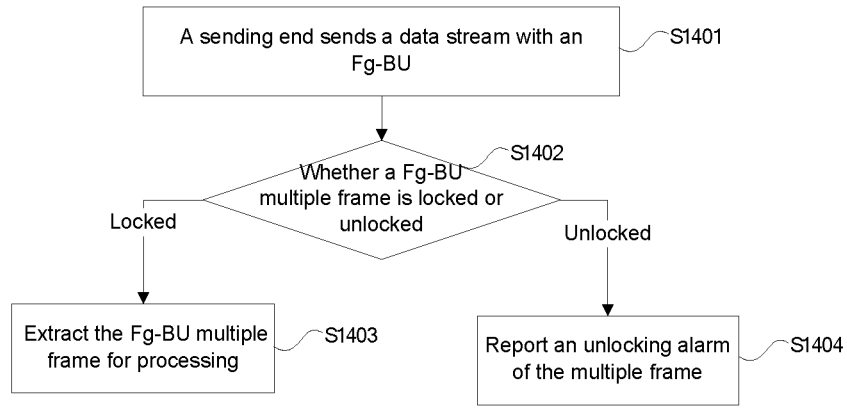
FIG. 14 is a schematic flowchart of a method for judging the locking and unlocking of an Fg-BU multiple frame according to Embodiment 4 of the present disclosure.

The present embodiment provides a method for judging the locking and unlocking of a fine granularity-basic unit (Fg-BU) multiple frame. As shown in FIG. 14, the method mainly includes the following steps:

Step S1401: in an Ethernet or an MTN based on an Ethernet technology, and an SPN, a sending end sends a data stream with a fine granularity-basic unit (Fg-BU).

Step S1402: after judging that the Fg-BU frame is locked after receiving data stream, a receiving end further judges whether a multiple frame thereof is locked or unlocked.

In the present embodiment, if the MFI values of consecutive X frames (X is an integer greater than or equal to 1) received by the receiving end are normal, that is, the MFI values are sequentially incremented, and an MFI value range definition is satisfied, it is judged that the multiple frame is locked.

Step S1403: after judging that the Fg-BU multiple frame is locked, the receiving end extracts the Fg-BU multiple frame for processing.

In the present embodiment, if the MFI values of consecutive Y frames received by the receiving end are abnormal, that is, the MFI values are not sequentially incremented, or the MFI value range definition is not satisfied, it is judged that the multiple frame is unlocked.

Step S1404: after judging that the Fg-BU multiple frame is unlocked, the receiving end reports an unlocking alarm of the multiple frame.

Embodiment 5

Figure 15:
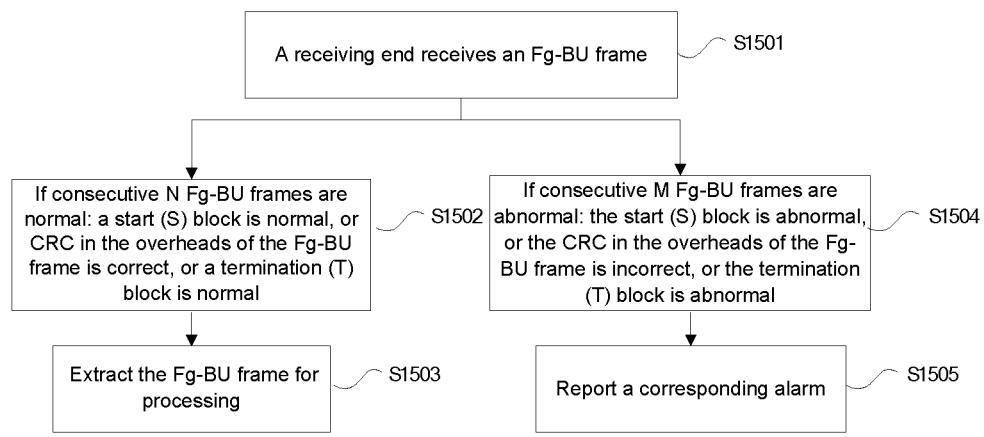
FIG. 15 is a schematic flowchart of a method for judging the locking and unlocking of an Fg-BU frame according to Embodiment 5 of the present disclosure.

The present embodiment provides a method for judging the locking and unlocking of a fine granularity-basic unit (Fg-BU). As shown in FIG. 15, the method mainly includes the following steps:

Step S1501: a receiving end receives an Fg-BU frame.

Step S1502: if consecutive N Fg-BU frames are normal, it is judged that the Fg-BU frame is locked. The judgement of the Fg-BU frame being normal needs to satisfy the following conditions:

The start (S) block is normal, that is, the 2-bit sync header (sync header) and/or 8-bit block type (block type) value of the S block is normal. In the present embodiment, the sync header and the block type value of the S block are shown in FIG. 1. Or, the CRC in the overheads of the FG-BU frame is correct, wherein the format of the overheads of the Fg-BU frame is shown in FIG. 6. Or, the termination (T) block is normal, that is, the 2-bit sync header (sync header) and/or 8-bit block type (block type) value of the T block is normal, wherein the format of the T block is shown in FIG. 3.

Step S1503: after judging that the Fg-BU frame is locked, the receiving end extracts the Fg-BU frame for processing.

Step S1504: if the receiving end receives consecutive M (M is an integer greater than or equal to 1) abnormal Fg-BU frames, including: the S block is abnormal, that is, the 2-bit sync header (sync header) is incorrect, or the 8-bit block type (block type) value is incorrect; or the CRC (as shown in FIG. 6) in the overheads of the FG-BU frame is incorrect; or any one of the sync header of the T block and the type of the T block is incorrect), it is judged that the Fg-BU frame is unlocked.

Step S1505: after judging that the Fg-BU frame is unlocked, the receiving end reports a corresponding alarm.

An embodiment of the present disclosure further provides a computer-readable storage medium, wherein a computer program is stored in the computer-readable storage medium, and the computer program is configured to execute the steps in any one of the foregoing method embodiments when running.

In an exemplary embodiment, the computer-readable storage medium may include, but is not limited to, various media capable of storing the computer program, such as a USB flash disk, a read-only memory (Read-Only Memory, ROM for short), a random access memory (Random Access Memory, RAM for short), a mobile hard disk, a magnetic disk, or an optical disc, etc.

An embodiment of the present disclosure further provides an electronic device, including a memory and a processor, wherein a computer program is stored in the memory, and the processor is configured to run the computer program to execute the steps in any one of the foregoing method embodiments.

In an exemplary embodiment, the electronic device may further include a transmission device and an input/output device, wherein the transmission device is connected with the processor, and the input/output device is connected with the processor.

For specific examples in the present embodiment, reference may be made to the examples described in the foregoing embodiments and exemplary embodiments, and thus details are not repeated in the present embodiment.

Obviously, it should be understood by those skilled in the art that, various modules or steps of the present disclosure may be implemented by a general computing device, may be concentrated on a single computing device or distributed on a network composed of a plurality of computing devices, and may be implemented by program codes executable by the computing device, therefore the modules or steps may be stored in a storage device to be executed by the computing device, and in some cases, the steps shown or described may be executed in an order different from that herein, or the modules and steps are respectively made into various integrated circuit modules respectively, or a plurality of modules or steps therein may be manufactured into a single integrated circuit module for implementation. As such, the present disclosure is not limited to any particular hardware and software combination.

The foregoing description is only preferred embodiments of the present disclosure, and is not intended to limit the present disclosure, and for those skilled in the art, the present disclosure may have various changes and modifications. Any modifications, equivalent replacements, improvements and the like, made within the principles of the present disclosure, shall fall within the protection scope of the present disclosure.

What is claimed is:

1. An Ethernet frame receiving method, comprising:
   receiving, by a receiving device, a data stream with a fine granularity-basic unit (Fg-BU); and
   judging, by the receiving device, whether an Fg-BU frame in the data stream is normal.

2. The method according to claim 1, further comprising:
   in a case that the receiving device receives consecutive N normal Fg-BU frames, judging that the Fg-BU frame is locked, wherein N is an integer greater than or equal to 1.

3. The method according to claim 1, wherein when the Fg-BU frame satisfies one or more of the following conditions, the Fg-BU frame is normal:
   a start block of the Fg-BU frame is normal;
   CRC in the overheads of the Fg-BU frame is correct;
   a terminal block of the Fg-BU frame is normal;
   a data blocks of the Fg-BU frame are normal, wherein a is an integer greater than or equal to 0; and
   a length of the Fg-BU frame is a predetermined number of blocks.

4. The method according to claim 1, further comprising:
   in a case that the receiving device receives consecutive M abnormal Fg-BU frames, judging that the Fg-BU frame is unlocked, wherein M is an integer greater than or equal to 1.

5. The method according to claim 1, wherein when the Fg-BU frame satisfies one or more of the following conditions, the Fg-BU frame is abnormal:
   the start block of the Fg-BU frame is abnormal;
   the terminal block of the Fg-BU frame is abnormal;
   the CRC in the overheads of the Fg-BU frame is incorrect;
   b data blocks of the Fg-BU frame are abnormal, wherein b is an integer greater than or equal to 0; and
   the length of the Fg-BU frame is not the predetermined number of blocks.

6. The method according to claim 2, wherein after the receiving device judges that the Fg-BU frame is locked, the method further comprises:
   extracting, by the receiving device, the Fg-BU frame for processing.

7. The method according to claim 4, wherein after the receiving device judges that the Fg-BU frame is unlocked, the method further comprises:
   reporting, by the receiving device, alarm information of unlocking of the Fg-BU frame.

8. The method according to claim 2, wherein after the receiving device judges that the Fg-BU frame is locked, the method further comprises:
   judging, by the receiving device, whether an Fg-BU multiple frame is locked or unlocked according to a multiple frame indication (MFI) value.

9. The method according to claim 8, wherein the receiving device judging that the Fg-BU multiple frame is locked according to the multiple frame indication (MFI) value comprises:
   in a case that the MFI values of consecutive X Fg-BU frames received by the receiving device are normal, judging that the Fg-BU multiple frame is locked, wherein X is an integer greater than or equal to 1.

10. The method according to claim 2, wherein judging, by the receiving device, that the Fg-BU multiple frame is unlocked according to the multiple frame indication (MFI) value comprises:
    in a case that the MFI values of consecutive Y Fg-BU frames received by the receiving device are abnormal, judging that the Fg-BU multiple frame is unlocked, wherein Y is an integer greater than or equal to 1.

11. The method according to claim 9, wherein after the receiving device judges that the Fg-BU multiple frame is locked, the method further comprises:
    extracting, by the receiving device, the Fg-BU multiple frame processing.

12. The method according to claim 10, wherein after the receiving device judges that the Fg-BU multiple frame is unlocked, the method further comprises:
    reporting, by the receiving device, alarm information of unlocking of the multiple frame.

13. An Ethernet frame receiving device, applied to a receiving device, and comprising at least one processor configured to:
    receive a data stream with a fine granularity-basic unit (Fg-BU); and
    judge whether an Fg-BU frame in the data stream is normal.

14. The device according to claim 13, wherein the at least one processor further configured to:
    judge that the Fg-BU frame is locked in the case that consecutive N normal Fg-BU frames are received, wherein N is an integer greater than or equal to 1.

15. The device according to claim 13, wherein the at least one processor further configured to:
    judge that the Fg-BU frame is unlocked in the case that consecutive M abnormal Fg-BU frames are received, wherein M is an integer greater than or equal to 1.

16. The device according to claim 13, wherein the at least one processor further configured to:
    judge, in the case that the Fg-BU frame is locked, whether an Fg-BU multiple frame is locked or unlocked according to a multiple frame indication (MFI) value.

17. The device according to claim 16, wherein the at least one processor further configured to:
    judge that the Fg-BU multiple frame is locked in the case that the MFI values of received consecutive X Fg-BU frames are normal, wherein X is an integer greater than or equal to 1.

18. The device according to claim 16, wherein the at least one processor further configured to:
    judge that the Fg-BU multiple frame is unlocked in the case that the MFI values of received consecutive Y Fg-BU frames are abnormal, wherein Y is an integer greater than or equal to 1.

19. A non-transitory computer-readable storage medium, wherein a computer program is stored in the computer-readable storage medium, and the computer program is configured to, when executed by a processor, implement the steps of the method according to claim 1.

20. An electronic device, comprising a memory, a processor, and a computer program which is stored on the memory and is capable of running on the processor, wherein the processor is configured to, when executing the computer program, implement the steps of the method according to claim 1.

* * * * *